(12) United States Patent
Zou et al.

(10) Patent No.: US 9,600,508 B1
(45) Date of Patent: Mar. 21, 2017

(54) DATA LAYER SERVICE AVAILABILITY (71) Applicant: Amazon Technologies, Inc., Seattle, WA (US)

(72) Inventors: Yongjuan Zou, Bellevue, WA (US); Srikanth Murali, Seattle, WA (US); Zhengqiang Xu, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/814,824

(22) Filed: Jul. 31, 2015

Related U.S. Application Data (63) Continuation of application No. 13/905,646, filed on May 30, 2013, now Pat. No. 9,098,266.

(51) Int. Cl.
| | |
|---|---|
| *G06F 13/37* | (2006.01) |
| *G06F 17/30* | (2006.01) |
| *G06F 13/00* | (2006.01) |
| *G06F 13/16* | (2006.01) |
| *G06F 13/42* | (2006.01) |
| *G06F 15/167* | (2006.01) |
| *G06F 15/80* | (2006.01) |
| *H04L 9/32* | (2006.01) |

(52) U.S. Cl.
CPC ........ *G06F 17/30321* (2013.01); *G06F 13/00* (2013.01); *G06F 13/1689* (2013.01); *G06F 13/37* (2013.01); *G06F 13/42* (2013.01); *G06F 15/167* (2013.01); *G06F 15/8061* (2013.01); *G06F 17/30477* (2013.01); *H04L 9/3213* (2013.01)

(58) Field of Classification Search
CPC ....... G05B 19/406; G06F 21/33; G06F 13/00; G06F 13/1689; G06F 13/37; G06F 13/42; G06F 15/167; G06F 15/8061; H04L 9/3213; H04L 63/0815; H04L 63/0421; H04L 63/0807; H04W 12/08
See application file for complete search history.

(56) References Cited

U.S. PATENT DOCUMENTS

| | | | |
|---|---|---|---|
| 8,533,796 B1 * | 9/2013 | Shenoy | H04L 63/0815 380/229 |
| 2008/0072301 A1 * | 3/2008 | Chia | G06F 21/41 726/8 |
| 2010/0290337 A1 * | 11/2010 | Suvi | H04W 12/08 370/217 |
| 2012/0117380 A1 * | 5/2012 | Herberth | G05B 19/406 713/155 |
| 2012/0260318 A1 * | 10/2012 | Fromentoux | H04L 63/0807 726/4 |
| 2013/0125228 A1 * | 5/2013 | Do | G06F 21/33 726/9 |

(Continued)

*Primary Examiner* — Le H Luu
(74) *Attorney, Agent, or Firm* — Thomas | Horstemeyer, LLP (57) ABSTRACT

Disclosed are various embodiments for a token management application. A data block tokenization call to a data layer service fails when a data store is unavailable. The token management application issues a temporary data token to the service calling the data layer service. The token management application completes the data block tokenization call on behalf of the service to obtain a valid data token. The valid data token is then communicated to services having the temporary data token.

20 Claims, 4 Drawing Sheets

(56) References Cited

U.S. PATENT DOCUMENTS

| | | | | |
|---|---|---|---|---|
| 2014/0025753 A1* | 1/2014 | Gronowski | ......... | H04L 63/0421 709/206 |
| 2014/0075568 A1* | 3/2014 | Sathyadevan | ....... | G06F 21/6218 726/27 |
| 2014/0282940 A1* | 9/2014 | Williams | ............ | H04L 63/0807 726/6 |

* cited by examiner

DATA LAYER SERVICE AVAILABILITY

CROSS-REFERENCE TO RELATED APPLICATIONS

This application is a continuation of and claims priority to U.S. application Ser. No. 13/905,646 titled "IMPROVING DATA LAYER SERVICE AVAILABILITY", filed May 30, 2013, which is incorporated herein by reference in its entirety.

BACKGROUND

Service-oriented architectures may implement a data layer service to facilitate secure storage and access of data. The data layer service issues tokens to a service storing data. The tokens are then passed to dependent services who may later exchange the tokens for the stored data. Problems arise when a data store accessed by the data layer service is unavailable, inhibiting the storage of data and issuance of tokens required by the services to continue their operations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Service oriented architectures implement a variety of interdependent services to facilitate functionality executed in a computing environment. For example, a service may depend on one or more other services to perform their intended functionality. In such an example, a service may delay its operations until another service upon which it depends has completed execution. For example, a service may access and therefore depend upon a data layer service which facilitates storage and access of data to a data store. The data layer service may access a data store to perform these functions. When the data store is unavailable, the data layer service is unable to complete a requested operation or function, thereby delaying the completion of an operation by a service dependent on the data layer service.

An example of an operation performed by a data layer service is a data tokenization call. A service may call the data layer service with a data object to be stored securely. The data layer service returns to the service a data token which allows a service possessing the data token to access the stored data object. This data token may be passed between services until one of the services requires the stored data. That service will then query the data layer service with the data token to obtain the original data object. Should the data store be unavailable, the service making the data tokenization call cannot proceed with its operations as is will not receive the data token which will be passed to other called services.

When a data store accessed by the data layer service is unavailable, the data block tokenization calls would fail. The token management application may generate a temporary data token for communication to the service making the data block tokenization call to the data layer service. This temporary data token may then be communicated between services to allow them to continue execution until the stored data block is required by a service. The token management application will then automatically query the data layer service with the data block tokenization call until the data store is available and obtain a valid data token. Concurrent to the token management application querying the data layer service, the other services continue to operate by communicating the temporary data token.

If a service requires the stored data block and possesses the temporary data token, such a service may then query the token management application with the temporary data token to obtain the valid data token. Once in possession of the valid data token, the service may then query the data layer service with the valid token to obtain the data block. Replacing the temporary data token with the valid data token may be facilitated by an application program interface, a callback application program interface, a subscription notification service, or by other approaches.

In the following discussion, a general description of the system and its components is provided, followed by a discussion of the operation of the same.

Figure 1:
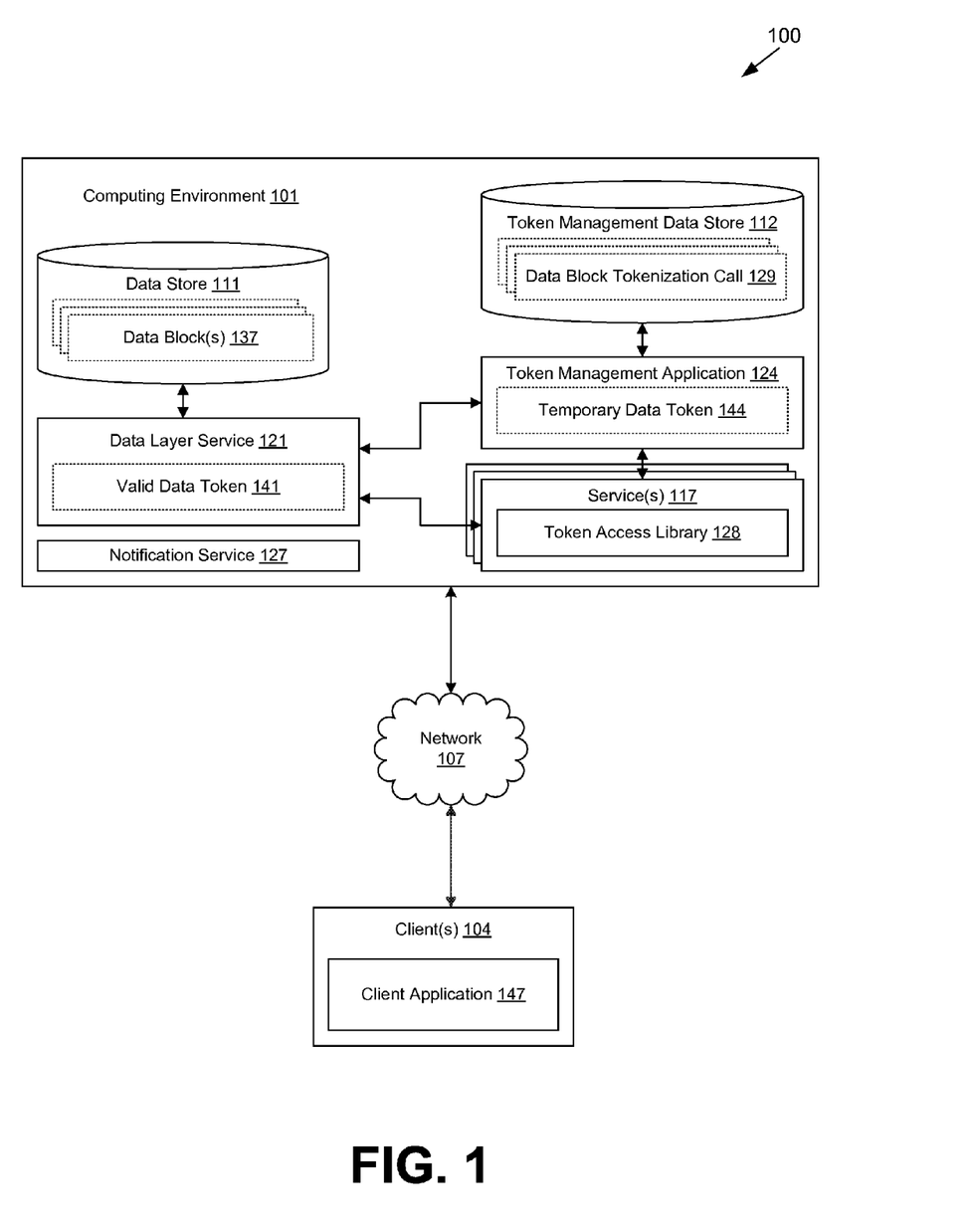
FIG. 1 is a drawing of a networked environment according to various embodiments of the present disclosure.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 and token management data store 112 that are accessible to the computing environment 101. The data store 111 and token management data store 112 may be representative of a plurality of data stores 111 and token management data stores 112 as can be appreciated. The data stored in the data store 111 and token management data store 112, for example, is associated with the operation of the various applications and/or functional entities described below.

The components executed on the computing environment 101, for example, include services 117, at least one data layer service 121, a token management application 124, a notification service 127, and other applications, services, processes, systems, engines, or functionality not discussed in detail herein. The services 117 comprise functionality to implement one or more capabilities, as well as to enable access to the one or more capabilities. A service 117 may access the functionality of one or more other services 117 to implement its own functionality, thereby being dependent upon the one or more distinct services 117. The interactions between services 117 may be implemented according to a service-oriented architecture. Such an architecture may create multiple interdependencies between the various services 117 executed in the computing environment 101. The service-oriented architecture of services 117 may be used to implement complex systems such as an electronic commerce system, web-hosting system, network application hosting system, or other systems as can be appreciated.

In some embodiments, services 117 may comprise a token access library 128 to facilitate the storage of data blocks 137 in the data store 111 and the obtaining of valid data tokens 141 via the data layer service 121. In some embodiments, the token access library 128 comprises functionality which determines if a data block tokenization call 129 is successfully completed by the data layer service 121 or if the data store 111 is unavailable. Responsive to the data block tokenization call 129 being unsuccessful or the data store 111 being unavailable, the token access library 128 may then communicate the data block tokenization call 129 to the token management application 124. The token management application 124 may then generate a temporary data token 144 as will be described later.

In other embodiments, the token access library 128 may communicate all data block tokenization calls 129 to the token management application 124, wherein the token management application 124 manages the communication of valid data tokens 141 from the data layer service 121 and the generation of temporary data tokens 144. The token access library 128 may also comprise other functionality, as well.

The data layer service 121 facilitates the storage and retrieval of data blocks 137 from the data store 111. The data layer service 121 may be accessible to one or more of the services 117. In some embodiments, the data layer service 121 may employ data tokenization functionality to restrict access to sensitive or confidential data embodied in a data block 137. In such an embodiment, the data layer service 121, responsive to a data block tokenization call 129 to store the data block 137 in the data store 111, generates a valid data token 141, which is returned to the calling service 117. Additionally, the data layer service 121 may perform encryption or decryption operations on data embodied in data block 137.

For example, a service 117 may store credit card or other payment data into the data store 111 via a data block tokenization call 129 to the data layer service 121 after being obtained from a client 104. The valid data token 141 returned by the data layer service 121 is then passed to other services 117 instead of the payment data. When a service 117 actually requires the payment data, such as a payment processing service 117, the service 117 may then query the data layer service 121 with the valid data token 141 to obtain the payment data for processing. In embodiments in which the payment data is stored in encrypted form, the data layer service 121 may also decrypt the payment data for use by the querying service 117. This ensures that only the services 117 requiring the private data have access to the private data.

The valid data token 141 comprises a unique identifier or potentially other data indicative of a corresponding stored data block 137. The unique identifiers of the valid data token 141 facilitate access to the corresponding stored data block 137 by services 117 querying the data layer service 121. A service 117 attempting to access the data block 137 must query the data layer service 121 with the valid data token 141 to prevent unauthorized access of the data block 137. To this end, valid data tokens 141 may be communicated between interdependent services 117. This allows a queried service 117 or a dependent service 117 to query the data layer service 121 when the corresponding data block 137 is required to perform some function or process.

The token management application 124 is executed to generate temporary data tokens 144 for communication to one of the services 117 responsive to the data store 111 being unavailable, and therefore inhibiting the completion of a data block tokenization call 129 from the service 117 to the data layer service 121. The temporary data token 144 comprises an identifier or other data differentiating it from a valid data token 141, prohibiting the temporary data token 144 from being communicated to the data store 111 to obtain a data block 137. The temporary data token 144 may otherwise be communicated between interdependent services 117 in the same manner as a valid data token 141.

The token management application 124 may store pending data block tokenization calls 129 in a token management data store 112. The stored data block tokenization calls 129 may then be retrieved from the token management data store 112 for querying to the data layer service 121. For example, the data block tokenization calls 129 may be stored in a relational database or other data structure which associates data block tokenization calls 129, valid data tokens 141, temporary data tokens 144, and potentially other data to facilitate the operations of the token management application 124. The token management data store 112 may comprise a dedicated token management data store 112 to facilitate the functionality of the token management application 124.

The token management application 124 may also implement functionality to communicate the valid data token 141 to a service 117 possessing the corresponding temporary data token 144. By replacing the temporary data token 144 with the valid data token 141, services 117 may then query the data layer service 121 for a stored data block 137.

The notification service 127 is executed to facilitate the exchange of notifications and other data between services 117 by implementing a subscription and publish model. The subscription and publish model allows a service 117 to subscribe to a notification topic. The notification service 127 is also configured to allow services 117 to publish notifications to a notification topic. Services 117 subscribed to the notification topic will then receive the published notification. For example, services 117 possessing a temporary data token 144 may subscribe to a notification topic to receive notifications when a valid data token 141 is available.

The data stored in the data store 111 may include, for example, data blocks 137, and potentially other data. These data blocks 137 have been communicated to the data store 111 by querying the data layer service 121 with a data block tokenization call 129. The data stored in the token management data store 112 may include, for example, data block tokenization calls 129, and potentially other data. The data block tokenization calls 129 are those data block tokenization calls 129 which could not be completed by the data layer service 121 due to the data store 111 being unavailable. The pending data block tokenization calls 129 are then stored in the token management data store 112 to allow the token management application 124 to query the data layer service 121 on behalf of the services 117.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 147 and/or other applications. The client application 147 may be executed in a client 104, for example, to access network content served up by the computing environment 101 and/or other servers. To this end, the client application 147 may comprise, for example, a browser, a dedicated application, etc. The client 104 may be configured to execute applications beyond the client application 147 such as, for example, email applications, social networking applications, word processors, spreadsheets, and/or other applications.

Next, a general description of the operation of the various components of the networked environment 100 is provided. The system of the various components of the networked environment 100 may be used to implement a service-oriented architecture requiring secure storage of data. For example, an electronic commerce system may require secure storage of payment instruments or credit card information until processed by a payment service 117. As another example, a web application or website may store login information or other user data until required by an authentication or login service 117.

To begin, a service 117 queries a data layer service 121 with a data block tokenization call 129 to store a data block 137 in the data store 111. This may be performed responsive to an interaction with a client 104, such as a request generated by a client application 147 executed in the client 104, or responsive to some other event. For example, a service 117 may obtain confidential data, payment information, or other data from a client 104 to be securely stored in the data store 111 until needed by another one of the services 117, inhibiting access to the securely stored data by other services 117. The service 117 may query the data layer service 121 with the data block tokenization call 129 by accessing functionality embodied in a token access library 128, or by another approach.

The data layer service 121, responsive to the data block tokenization call 129, attempts to store the data block 137 in the data store 111. If the data store 111 is available and the data block 137 is successfully stored, the data layer service 121 then communicates valid data token 141 to the service 117 communicating the data block tokenization call 129 to facilitate a later retrieval of the corresponding data block 137. If the data store 111 or the data layer service 121 is otherwise unable to complete the data block tokenization call 129 initiated by the service 117, the service 117 then communicates the data block tokenization call 129 to the token management application 124.

After receiving the data block tokenization call 129, the token management application 124 communicates a temporary data token 144 to the service 117 communicating the data block tokenization call 129. The temporary data token 144 may comprise data distinguishing it from a valid data token 141, data indicating a corresponding data block tokenization call 129 or data block 137, and potentially other data.

Communicating the temporary data token 144 to the service 117 executing the data block tokenization call 129 allows the service 117 to continue executing while the data store 111 is unavailable. Additionally, the temporary data token 144 may be communicated between services 117 in the same manner as a valid data token 141 to allow interdependent services 117 to continue functioning until a valid data token 141 is required.

In some embodiments, the token management application 124 may store the data block tokenization call 129 or potentially other data in a token management data store 112 responsive to receiving the data block tokenization call 129. In such an example, the overall reliability of the services 117 accessing data layer service 121 and the token management application 124 is improved by requiring a failure of both the data store 111 and the token management data store 112 to inhibit the performance of services 117 requiring a valid data token 141. The token management data store 112 may also comprise other data to facilitate the operation of the token management application 124 and to encode the state of currently pending data block tokenization calls 129 to be submitted to the data layer service 121.

Once the service 117 communicating the data block tokenization call 129 obtains the temporary data token 144, the service 117 may then continue execution, including calling depended services 117 by passing the temporary data token 144. Interdependent services 117 may similarly continue execution by passing the temporary data token 144 until one of the services requires the data block 137 corresponding to the temporary data token 144.

The token management application 124 repeatedly submits the obtained data block tokenization call 129 to the data layer service 121 until a valid data token 141 can be obtained from the data layer service 121. The token management application 124 queries the data layer service 121 concurrent to the execution of the interdependent services 117. This allows for the interdependent services 117 to operate without waiting for a complete data block tokenization call 129. Repeatedly querying the data block tokenization call 129 may comprise loading one or more incomplete data block tokenization calls 129 from a token management data store 112 for communication to the data layer service 121. The token management application 124 may submit the data block tokenization call 129 to the data layer service 121 responsive to a predefined condition, at a predefined interval, at an increasing or otherwise dynamically calculated interval, or by other approach.

At some point while the token management application 124 is querying the data layer service 121, the data store 111 becomes available. This allows the data layer service 121 to complete the data block tokenization call 129. The data block 137 corresponding to the data block tokenization call 129 is stored in the data store 111. The data layer service 121 then issues a valid data token 141 for the data block tokenization call 129 to the token management application 124.

Next, after the token management application 124 has obtained the valid data token 141 from the data layer service 121, the token management application 124 then communicates the valid data token 141 to one or more services 117 having the temporary data token 144. In some embodiments, the token management application 124 may expose an application program interface (API) to the services 117 to facilitate an obtaining of the valid data token 141. The token management application 124 may then process API calls from the services 117 and return a valid data token 141 to the calling service 117.

For example, a payment processing service 117 must access a payment instrument or other data encoded in the stored data block 137 to complete a financial transaction. The payment processing service 117 may determine that it possesses a temporary data token 144, and therefore cannot access the data block 137 via the data layer service 121. The payment processing service 117 may be configured to call the exposed API to retrieve the valid data token 141 from the token management application 124.

In some embodiments, a service 117 may call the API prior to the valid data token 141 being obtained by the token management application 124. The service 117 may then be configured to repeat the API call until the valid data token 141 is available. The service 117 executing API call may also execute other functionality in parallel to waiting for an API response having the valid data token 141 from the token management application 124.

In other embodiments, the token management application 124 may expose a callback API to the services 117. The callback API allows a service 117 to make a callback API call to the token management application 124 and continue execution with other processes without waiting for a response to the callback API call. The token management application 124 may then asynchronously communicate a response to the callback API call when the valid data token 141 is available.

In further embodiments, the token management application 124 may communicate a notification to a notification service 127 to notify one or more services 117 that the valid data token 141 is available. This may comprise, for example, publishing a notification to a subscription notification service 127 such as a Simple Notification Service (SNS) or another subscription notification service 127. In such an embodiment, services 117 would subscribe to a notification topic associated with the valid data token 141. The token management application 124 would then publish the notification to the notification service 127, which would then communicate the notification to the subscribed services 117.

In some embodiments, the notification may comprise the valid data token 141. In other embodiments, the services 117 may initiate an API call or otherwise obtain the valid data token 141 from the token management application 124 responsive to the notification. The valid data token 141 may also be communicated to the services 117 by another approach.

After obtaining the valid data token 141, a service 117 may then communicate the valid data token 141 to the data layer service 121 to obtain the corresponding data block 137 from the data store 111. This will allow the service 117 to complete operations requiring the data block 137.

In another embodiment, a service 117 may attempt to make a data block tokenization call 129 to the data layer service 121 for a data block 137 comprising encrypted data at a time in which the data store 111 is unavailable. As was previously discussed, this will result in a failed data block tokenization call 129 for the data block 137. The service 117 may then pass the data block 137 to other services 117 in the same manner as a valid token 141 or a temporary token 144. The confidentiality of the data embodied in the data block 137 is preserved when being passed between services 117 due to the encryption applied to the data. The encryption may be applied by a client 104 from which the data was obtained, by a service 117, or by another approach.

When a called service 117 having the data block 137 requires the data encrypted in the data block 137, the called service 117 may then query the data layer service 121 with the data block 137 to obtain the data embodied in the data block 137 in decrypted form. The called service 117 may then perform the functionality requiring the decrypted data.

Figure 2:
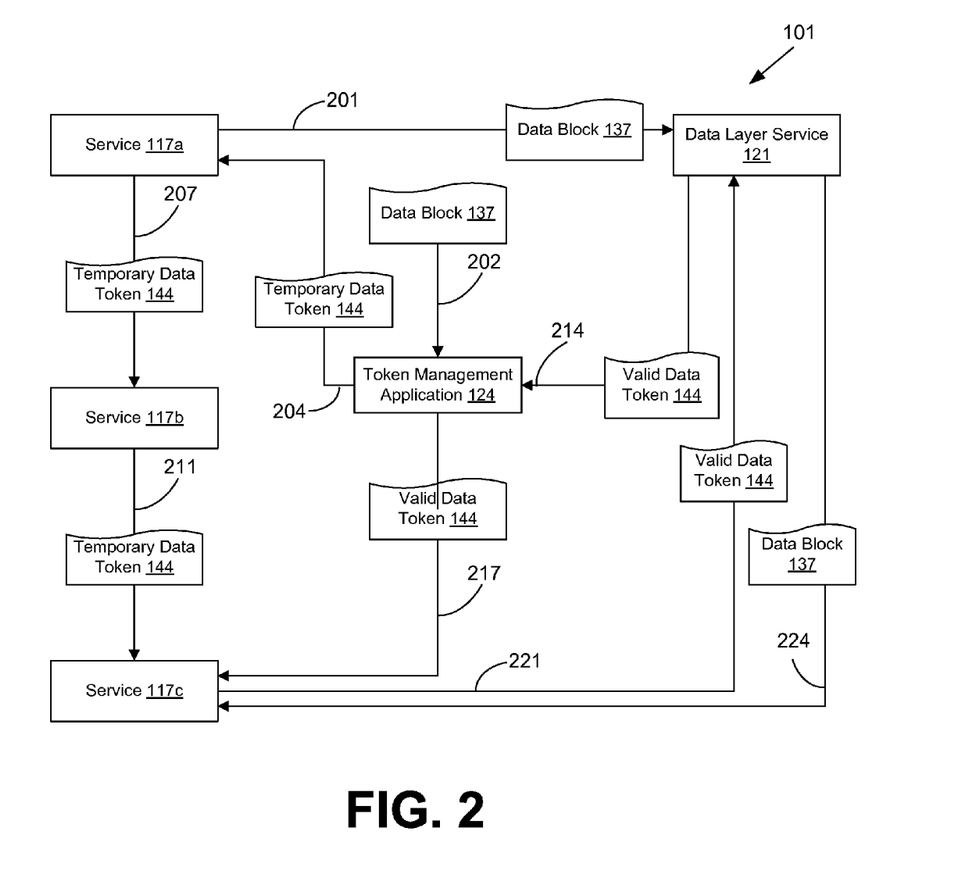
FIG. 2 is a flow diagram illustrating an example of data layer service access implemented as portions of functionality executed in the computing environment of the networked environment of FIG. 1 according to various embodiments of the present disclosure.

Referring next to FIG. 2, shown is a flow diagram embodying an example of interoperability between services 117 (FIG. 1), depicted here as services 117a, 117b, and 117c, a data layer service 121 and a token management application 124 as executed in a computing environment 101 (FIG. 1). Beginning with item 201, a service 117a executes a data block tokenization call 129 (FIG. 1) which communicates a data block 137 to the data layer service 121 for storage in a data store 111 (FIG. 1). In this example, the data store 111 is unavailable at the time that the data block tokenization call 129 is executed.

Responsive to the data store 111 being unavailable, the service 117a communicates the data block 137 to the token management application 124 in item 202. This will allow the token management application 124 to continue to make data block tokenization calls 129 to the data layer service 121 on behalf of service 117a. The token management application 124 then generates a temporary data token 144 corresponding to the data block 137. The temporary data token 144 is then communicated by the token management application 124 to service 117a in item 204.

Service 117a depends on service 117b to execute its functionality. In item 207, the service 117a calls service 117b with the temporary data token 144. Service 117b depends on service 117c to execute its functionality, and in item 211 calls service 117c with the temporary data token 144. Contemporaneous to the calling of services 117b and 117c, in item 214, the token management application 124 successfully completes the data block tokenization call 129 and obtains a valid data token 141 from the data layer service 121.

Service 117c requires the data block 137 stored by service 117a in the data block tokenization call 129 depicted in item 201, and therefore queries the token management application 124 for a valid data token 141 in item 217. This may comprise executing an API call, obtaining a notification embodying the valid data token 141, or some other approach. Service 117c then queries the data layer service 121 in item 221 with the valid data token 141 in item 221. In response to the valid data token 141, the data layer service 121 then communicates the corresponding the data block 137 to service 117c. This allows service 117c to perform the operations requiring the data block 137.

Figure 3:
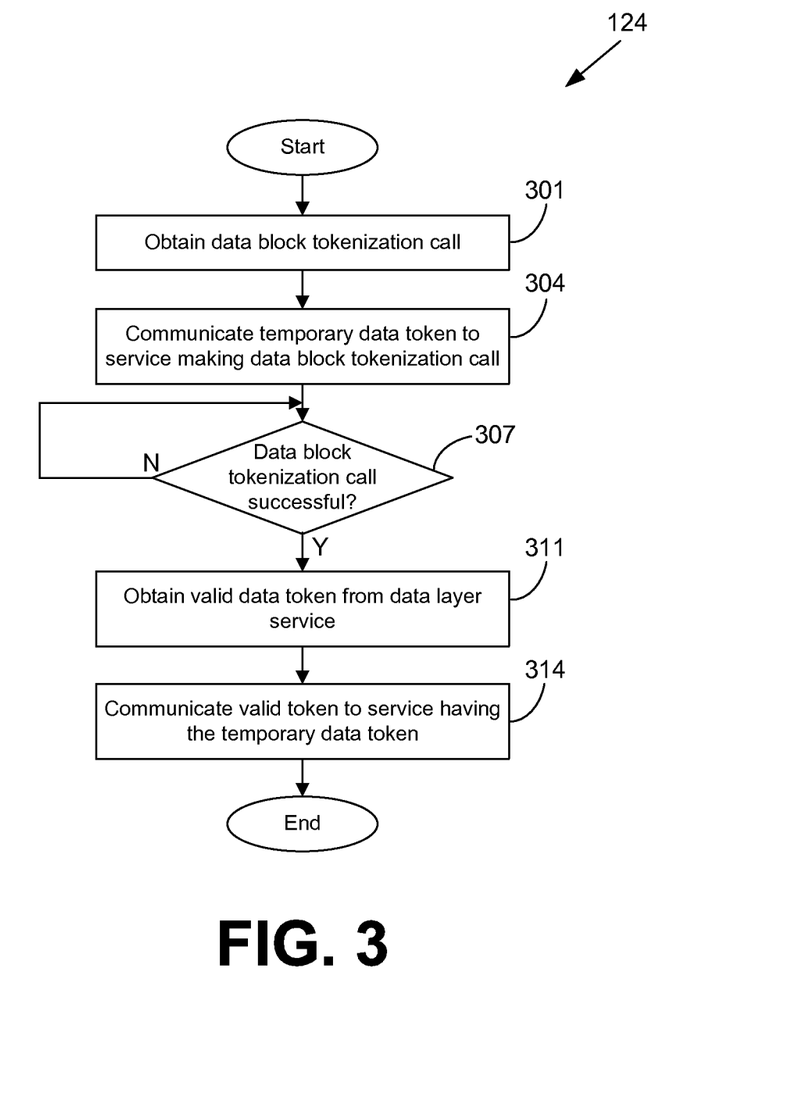
FIG. 3 is a flowchart illustrating one example of functionality implemented as portions of a token management application executed in a computing environment in the networked environment of FIG. 1 according to various embodiments of the present disclosure.

Referring next to FIG. 3, shown is a flowchart that provides one example of the operation of a portion of the token management application 124 according to various embodiments. It is understood that the flowchart of FIG. 3 provides merely an example of the many different types of functional arrangements that may be employed to implement the operation of the portion of the token management application 124 as described herein. As an alternative, the flowchart of FIG. 3 may be viewed as depicting an example of steps of a method implemented in the computing environment 101 (FIG. 2) according to one or more embodiments.

Beginning with box 301, the token management application 124 obtains a data block tokenization call 129 (FIG. 1)

from a service 117 (FIG. 1). This may be facilitated by a token access library 128 (FIG. 1) or other functionality implemented in the service 117. In some embodiments, the token management application 124 stores the data block tokenization call 129 in a token management data store 112 (FIG. 1) for later retrieval, or to facilitate querying the data layer service 121 (FIG. 1).

Next, in box 304, the token management application 124 communicates a temporary data token 144 (FIG. 1) to the service 117 from which the data block tokenization call 129 was obtained. The temporary data token 144 may comprise data or metadata distinguishing it from a valid data token 141 (FIG. 1), data indicating a corresponding data block 137 (FIG. 1) or data block tokenization call 129 (FIG. 1) or other data.

In box 307, the token management application 124 repeatedly queries the data layer service 121 with the obtained data block tokenization call 129 until successful. Responsive to the data block tokenization call 129 initiating a successful storage of a data block 137 (FIG. 1) in the data store 111 (FIG. 1), the token management application 124 then obtains a valid data token 141 from the data layer service 121 in box 311.

Next, in box 314, the token management application 124 communicates the valid data token 141 to a service 117 having the temporary data token 144. In some embodiments, this comprises the token management application 124 obtaining an API call from a service 117 requiring the valid data token 141 to access the corresponding data block 137 stored in the data store 111. The API call may comprise, for example, the temporary data token 144, enabling the token management application 124 to return the corresponding valid data token 141. In some embodiments, the API call may comprise a callback API call which initiates a callback response to the service 117 upon the token management application 124 obtaining the valid data token 141 from the data layer service 121. The token management application 124 may then communicate the valid data token 141 in response to the API call.

In other embodiments, communicating the valid data token 141 to a service 117 may be facilitated by a notification service 127 (FIG. 1) to which services 117 are subscribed. For example, a service 117 requiring the valid data token 141 may subscribe to the notification service 127 to be notified when the valid data token 141 is available. After obtaining the valid data token 141, the token management application 124 may publish a notification to the notification service 127, thereby notifying the subscribed services 117. A notified service 117 may then initiate an API call as described above responsive to the notification to obtain the valid data token 141. The notification generated by the notification service 127 may also comprise the valid data token 141 such that all the subscribed services 117 automatically obtain the valid data token 141. The valid data token 141 may also be communicated to services 117 by other approaches.

Figure 4:
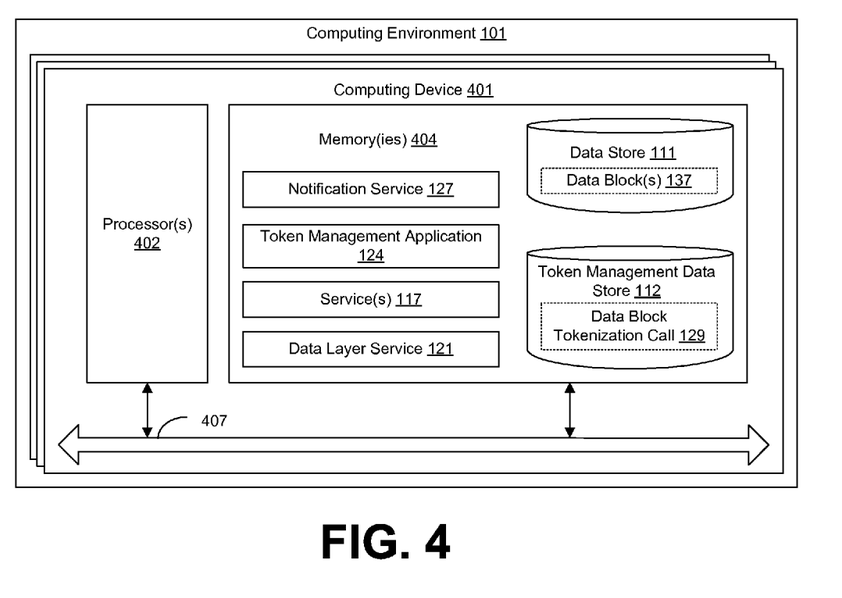
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are services 117, a data layer service 121, a token management application 124, a notification service 127, and potentially other applications. Also stored in the memory 404 may be a data store 111 having data blocks 137, a token management data store 112 having data block tokenization calls 129, and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the token management application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the token management application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the token management application 124, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   generate a temporary token responsive to at least one data store being unavailable to complete a data block tokenization call from one of a plurality of services to a data layer service facilitating access to the at least one data store; and
   communicate the temporary token to the one of the plurality of services, wherein the temporary token is capable of being passed to other ones of the plurality of services.

2. The non-transitory computer-readable medium of claim 1, wherein the program further causes the at least one computing device to at least:
   communicate a valid token to a respective one of the plurality of services having the temporary token after the at least one data store becomes available; and
   wherein the valid token facilitates access to a data block corresponding to the valid token stored in the at least one data store.

3. The non-transitory computer-readable medium of claim 2, wherein the program further causes the at least one computing device to at least repeatedly query the data layer service with the data block tokenization call until obtaining the valid token from the data layer service in response to the data block tokenization call.

4. A system, comprising:
   at least one data store;
   at least one computing device comprising at least one processor and memory storing instructions that, when executed by the at least one processor, cause the at least one computing device to at least:
      generate a temporary token responsive to the at least one data store being unavailable to complete a data block tokenization call from one of a plurality of services to a data layer service facilitating access to the at least one data store; and communicate the temporary token to the one of the plurality of services, wherein the temporary token is capable of being passed to other ones of the plurality of services.

5. The system of claim 4, wherein the instructions further cause the at least one computing device to at least:

communicate a valid token to a respective one of the plurality of services having the temporary token after the at least one data store becomes available; and wherein the valid token facilitates access to a data block corresponding to the valid token stored in the at least one data store.

6. The system of claim 5, wherein the instructions further cause the at least one computing device to at least:

receive a request comprising the temporary token from the respective one of the plurality of services having the temporary token; and wherein communicating the valid token to the respective one of the plurality of services is performed in response to the request.

7. The system of claim 6, wherein the request comprises an application program interface call from the respective one of the plurality of services having the temporary token.

8. The system of claim 5, wherein the instructions further cause the at least one computing device to at least repeatedly query the data layer service with the data block tokenization call until obtaining the valid token from the data layer service in response to the data block tokenization call.

9. The system of claim 8, wherein the data layer service is repeatedly queried at an interval of an increasing duration.

10. The system of claim 4, wherein the temporary token comprises an identifier prohibiting access to a data block corresponding to the data block tokenization call.

11. The system of claim 4, wherein the instructions further cause the at least one computing device to at least:

communicate to at least a subset of the plurality of services a notification that a valid token is available; and wherein the valid token facilitates access to a data block corresponding to the valid token stored in the at least one data store.

12. The system of claim 11, wherein the instructions further cause the at least one computing device to at least communicate the notification by publishing the notification to a subscription notification service to which the at least a subset of the plurality of services is subscribed.

13. The system of claim 12, wherein the notification comprises the valid token.

14. A method, comprising:

generate, by at least one computing device, a temporary token responsive to at least one data store being unavailable to complete a data block tokenization call from one of a plurality of services to a data layer service facilitating access to the at least one data store; and communicate, by the at least one computing device, the temporary token to the one of the plurality of services, wherein the temporary token is capable of being passed to other ones of the plurality of services.

15. The method of claim 14, further comprising:

communicating, by the at least one computing device, a valid token to a respective one of the plurality of services having the temporary token after the at least one data store becomes available; and wherein the valid token facilitates access to a data block corresponding to the valid token stored in the at least one data store.

16. The method of claim 15, further comprising:

receive an application program interface call from the respective one of the plurality of services having the temporary token; and wherein communicating the valid token to the respective one of the plurality of services is performed in response to the application program interface call.

17. The method of claim 16, wherein the application program interface call comprises the temporary token.

18. The method of claim 16, wherein the application program interface call comprises a callback application program interface call.

19. The method of claim 14, wherein the temporary token comprises an identifier prohibiting access to a data block corresponding to the data block tokenization call.

20. The method of claim 15, further comprising repeatedly querying, by the at least one computing device, the data layer service with the data block tokenization call until obtaining the valid token from the data layer service in response to the data block tokenization call.

* * * * *